Oct. 21, 1958

R. J. BRANSON 2,856,949

AUTOMATIC DUMP VALVE

Filed March 23, 1953

INVENTOR.

BY R. J. Branson

C. M. McKnight

Oct. 21, 1958  R. J. BRANSON  2,856,949
AUTOMATIC DUMP VALVE
Filed March 23, 1953  2 Sheets-Sheet 2

INVENTOR.
BY R. Branson
C. McKnight

United States Patent Office 2,856,949
Patented Oct. 21, 1958

2,856,949

AUTOMATIC DUMP VALVE

Raymond J. Branson, Tulsa, Okla.

Application March 23, 1953, Serial No. 344,046

2 Claims. (Cl. 137—172)

This invention relates to a float operated dump valve adapted to be used in oil and water separators or similar tanks handling fluids of different specific gravities. It is preferable, but not limited thereto, to dispose the valve in the bottom housing of the sump tank which is usually attachable to the under side of the separator or tank.

The invention is more specifically concerned with a differential area valve which is diaphragm controlled through the actuation of a float member disposed in the fluid or liquid level of the tank in which the valve is disposed. Movement of the float member simultaneously provides movement of a valve guide member which in turn relieves pressure on one side of the main valve to open the valve whereupon discharge of the liquid from the tank is effected. As soon as the liquid in the tank is reduced to provide an interfacial tension corresponding to a predetermined calibration of the float member, the pressure on one side of the diaphragm is permitted to build up causing the diaphragm to close the main valve to discharge of the liquid from the tank.

It is an important object of this invention to provide a diaphragm actuated dump valve for a separator or the like which is effective to maintain an interfacial tension relation between liquids of different specific gravities, and wherein the valve is automatic to dump or relieve the separator of heavier liquids normally disposed in the lower level of the separator.

And another object of this invention is to provide an automatic dump valve for discharging heavier liquids from the bottom of the separator sump tanks or the like which has a floating guide member arranged with sufficient tolerances or clearances to prevent any actuation thereof by sloshing or swishing of the liquid in the tank during transit of the separator equipment.

And still another object of this invention is to provide an automatic dump valve for separator tanks and the like having a diaphragm actuated valve member which is separate and independent from the diaphragm in order that the valve is always seated irrespective of any clogging of the diaphragm actuator by sand, debris or the like.

And still another object of the invention is to provide an automatic dump valve for maintaining interfacial tension between liquids of variable gravities in a separator or the like which is simple in construction, efficient in operation and durable.

Other objects and advantages of the invention will be evident from the following detailed description, read in conjunction with the accompanying drawings, which illustrate my invention.

Figure 1:
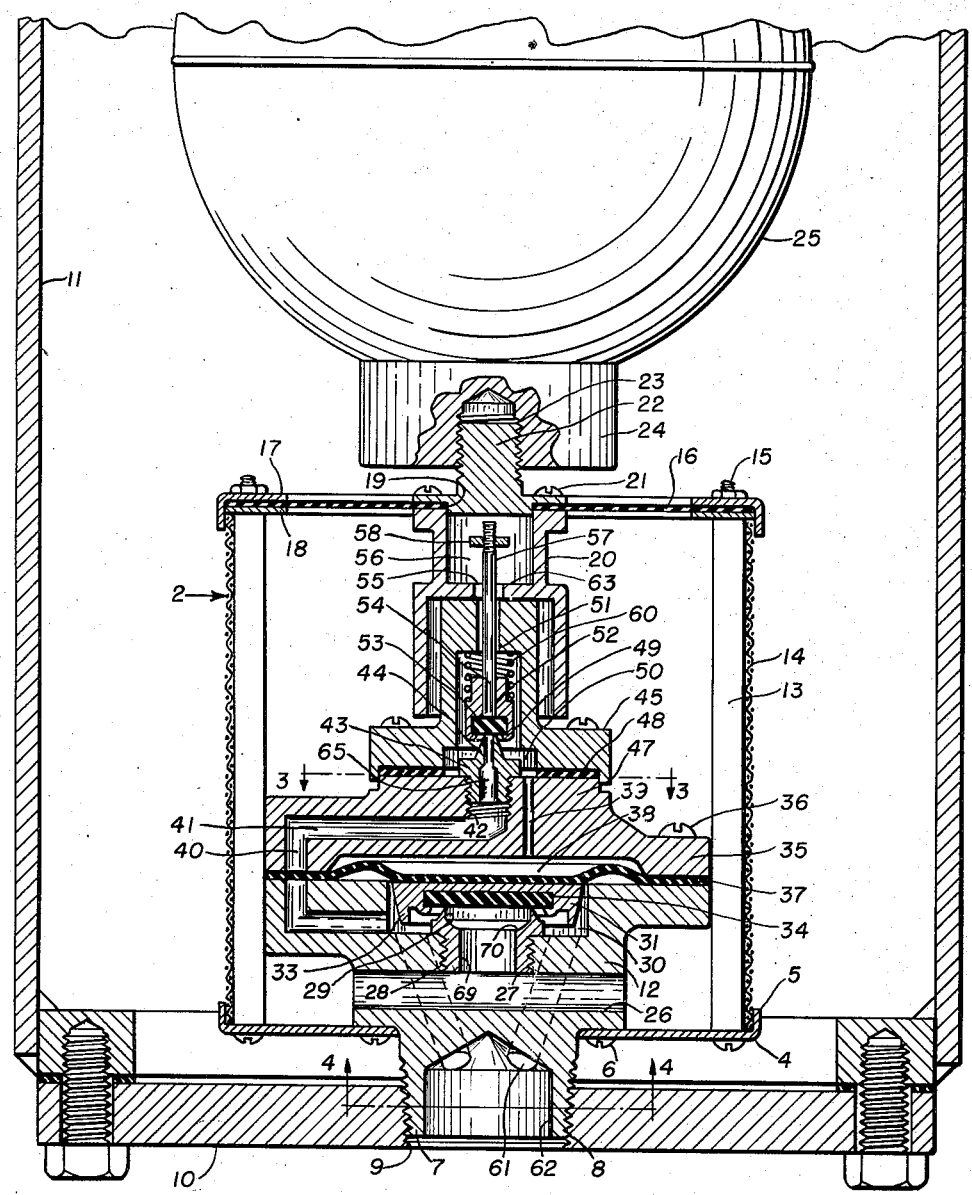
Figure 1 is a sectional elevational view with certain parts broken away for clarity showing the valve disposed in the lower portion of a sump tank.

Referring to the drawings in detail, reference character 2 designates the valve apparatus generally which comprises a bottom plate 4 having upstanding vertical leg members 5 and attachable through suitable bolts 6 to an inverted U-shaped flange member 7. The member 7 is provided with external threads 8 threadedly secured into the threaded aperture 9 of a bottom plate 10 of a sump tank 11 which is usually attachable to the underface of a separator or the like (not shown). The member 7 forms the lower portion of the valve housing 12 which is disposed within the sump tank 11 and contains liquids such as oil and water having different specific gravities. It will be understood that the utilization of the automatic valve is not limited to oil and water, but may be utilized in separators handling all kinds of liquids having variable contaminates such as sand, mud, slush oil and the like. The plate 4 supports a plurality (preferably four) upstanding shaft members 13 around which is disposed a circular screen member 14 forming a strainer apparatus around the valve housing 12. The upper ends of the shafts 13 are of reduced diameter and threaded at 15 for receiving a diaphragm member 16 held thereto by a pair of annular upper and lower ring members 17 and 18 respectively (Fig. 1). The diaphragm 16 is provided with an aperture 19 having attached to the peripheral edges thereof a floating guide member 20. The guide member 20 is held to the diaphragm by suitable bolts 21. The guide member is provided with an upstanding threaded stem member 22 connecting with a threaded recess 23 provided in a lower circular portion 24 of a substantially spherical shaped balanced float member 25. The float 25 may be balanced for certain specific gravity ratings of hydrocarbons, such as jet fuel, diesel oil and the like, and it may also be balanced for lighter carbon vapors, such as the butane and propane series. The balancing of the float is based on the liquid displacement of spherical floats by volume and weight relative to various specific gravities of fluids with which it may be used. In the present instance, the float 25 is preferably, but not limited thereto, calibrated so that it will float in a heavier liquid and sink in a lighter liquid maintained in the tank 10 and between which there is an interfacial tension.

The valve housing 12 is provided with a passageway (Fig. 1) 26 in turn communicating with a threaded aperture 27 in which is threadedly disposed a circular valve seat 28. The valve seat 28 has an upstanding circular flange member 29 with knife like top peripheral edges acting as the seat proper for purposes as will be hereinafter set forth. The valve housing 12 is provided with a recessed portion 30 in which is disposed the circular valve member 31 comprising a flat disc like body portion having a downwardly extending rim or circular flange portion 33. The valve 31 is provided with a recessed portion for receiving a valve disc or rim 34 of any suitable resilient composition such as rubber or the like.

Figure 3:
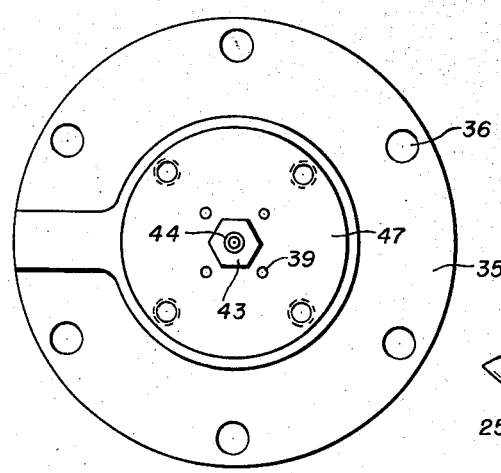
Figure 3 is a plan view taken on lines 3—3 of Fig. 1.

The valve housing 12 is provided with an upper segment 35 secured to the housing 12 by any suitable studs 36 and interposed between the segments is a diaphragm member 37 having a portion thereof in contact with the top of the main valve member 31. The upper segment 35 is provided with a cut-away or recessed portion providing a pressure chamber 38 on top of the main valve 31 and the diaphragm 37 for purposes as will be hereinafter set forth. Furthermore, the upper housing 35 is provided with a plurality of circumferentially spaced (preferably four) ports or passageways 39 (Figs. 1 and 3) connecting with the chamber 38 for purposes as will be hereinafter set forth. The upper segment 35 is provided with a vertically disposed passageway 40 connecting with a horizontal passageway 41 in turn connecting with a vertically disposed threaded port 42. An apertured valve seat 43 is threadedly disposed in the port 42 and is provided with an upstanding cone like flange 44 having upper knife like edges providing the seat proper for a valve member as will be subsequently described.

Figure 2:
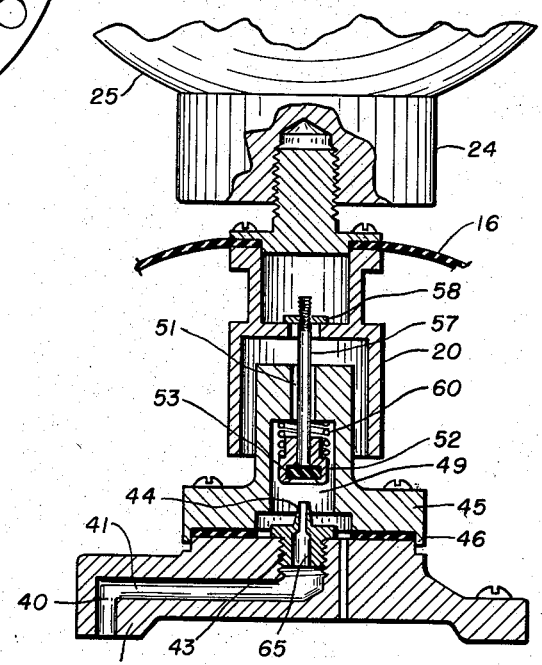
Figure 2 is a sectional elevational view showing more in detail the valve guide member and the pilot valve structure.
Figure 4:
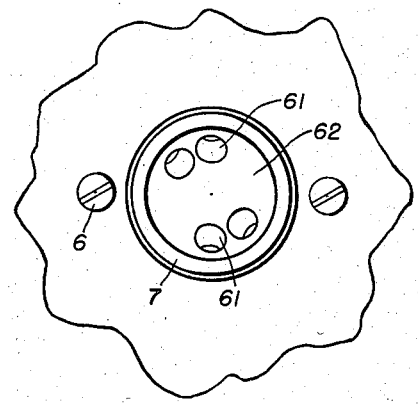
Figure 4 is a detail view taken on lines 4—4 of Fig. 1.

The upper housing 35 is adapted to receive a pilot valve housing 45 having a circular rim member 46 (Figs. 1 and 2) with the rim disposed over the flange portion 47 of the upper segment 35 (note Figs. 2 and 3), and having a sealing gasket 48 interposed therebetween. The pilot valve housing 45 is provided with a central bore 49 having a large diameter 50 and a smaller diameter portion 51 at opposite ends thereof. A spring urged valve member 52 is disposed in the bore 49 and is provided with a resilient composition valve ring 53 adapted to seat against the knife like upper edges of the cone valve seat 49. A valve rod 54 is provided in the pilot valve 52 and extends upwardly therefrom through the minor bore 51 and through an enlarged aperture 55 and into a chamber 56 provided in the valve guide 20. The upper end of the valve rod 54 is threaded at 57 to receive an adjustable stop nut 58 for purposes as will be hereinafter set forth. A helical spring 60 is disposed in the bore 49 and is anchored between the top of the valve member 52 and the upper end of the bore 49 and serves the purpose of constantly urging the pilot valve 52 into seating relation with the seat 44. The valve housing 12 is provided with a plurality of circumferentially spaced outlet conduits 61 (dotted lines Fig. 1 and Fig. 4), adapted to communicate with an outlet recess 62 of the inverted U-shaped flange member 7.

*Operation*

In operation of the automatic dump valve, liquid is maintained in the sump tank 11 and this liquid is usually liquids of different specific gravities wherein the heavier liquid is disposed in the lower levels of the tank with the lighter liquid above. With any variation in the level, such as an increase in volume, the balanced float member 25 will be caused to move upwardly which in turn moves the upper diaphragm 16, thereby providing a simultaneous upward movement of the floating guide member connected with the diaphragm 16. Continued upward movement of the guide 20 brings the face 63 thereof in contact with the nut 58 to raise the valve rod 54 and unseat the pilot valve 53 from the seat 44. In an unseated condition of the pilot valve, any fluid under pressure in the chamber 38 normally providing pressure maintenance against the top of the diaphragm 37 is relieved through the passageways 39, bore 50 and the central bore 65 provided in the valve seat 43 to be discharged into the passageways 41, 40 communicating with the outlet passageways 61. With relief of fluid pressure on the top side of the diaphragm 37 the constantly maintained liquid in the tank 12 against the under face of the valve member 34 provides a differential pressure on opposite sides of the valve to unbalance it, whereupon it is caused to move upward into an open position, thereby permitting the liquid in the tank, and particularly the heavier liquid in the lower portion of the tank, to flow through the passageways 26, apertures 28, 29 and through the unseated valve 34 into communication with the discharge ports 61. In this manner the liquid in the level of the tank is decreased accordingly.

It will be apparent that the float member may be weighted or balanced in any predetermined manner to establish the interfacial tension relation between the liquids of variable gravities at any level within a container as may be desired. In the present instance it is preferable to float the members 25 about the diametric center thereof in order to control the level of the interfacial relationship between the liquids. Consequently, as soon as the heavier liquid in the tank is discharged in sufficient volume to establish the proper interfacial relationship the float is moved downward to reseat the pilot valve 53. It has been found under practical tests that the variance in liquid level necessary to maintain interfacial relationship in most instances amounts to no more than two inches.

With the float 25 moving downward the face 63 of the guide member 20 is moved downwardly away from the adjustable nut 58 thereby permitting the tension of spring 60 to close the valve ring 53 against the cone like seat 44. As soon as the valve 53 becomes closed, liquid pressure flowing through the strainer screens 14 will flow under the floating guide 20 and through the aperture 55 and bore 51, through bores 49, 50, 39 and into the chamber 38 above the diaphragm 37 thereby building up pressure within the chamber 38 which acts against the top of the diaphragm 37.

The area of the diaphragm is larger than that of the main valve 31 and thus provides a differential pressure area therebetween whereby the valve 31 is caused to move downwardly into seating relation with the knife seat 29 irrespective of the liquid pressure acting against the bottom side thereof. Consequently with the valve 31 moved into seated position, there is a simultaneous shutting off of the discharge of liquid from passageways 26 through the valve 54 and outlet passageway 61. The valve member is maintained in its seated relation as long as the greater pressure is maintained in the chamber 38 above the diaphragm 37. Of course as the liquid level rises, it provides a change in interfacial tension and there is a relief of pressure in the chamber 38 causing operation of the dump valve as previously explained.

The valve seat 28 is provided with a bore 69 of a smaller diameter than the connecting bore 70 in order that there will be substantially a venturi action of the liquid passing through the passageway 26 into the bores 69 and 70. It will thus be seen that with the valve 31 in unseated position there is a greater weir discharge from the bore 70 without the necessity of any large opening of the valve for increasing the discharge therethrough. Furthermore, this particular area arrangement of the bores 69 and 70 functions to increase the seating action of the valve 31.

The floating member 20 is independent and separate from the diaphragm 37 so that in the event the diaphragm 37 becomes clogged by debris, sand or other matter that may be present in the chamber 38, the valve member 31 will still function in its normal operation. The top face of the lower valve housing 12 may be provided with any type of suitable bleed ports (not shown) in order that any liquid that may have been trapped under the diaphragm during operation thereof could be relieved thereby assuring full operation of the diaphragm 37 against the valve body 31.

The floating guide member 20 is so constructed to eliminate any damage by movement of the equipment in transit. In transit the sump tank containing liquid will have a tendency to swish and slosh thereby cause fluctuation of the float 25. However, the pilot valve 52 is prevented from functioning by any swishing because of the slack between the top face 63 of the float guide 20 and the nut 58. The pilot valve 52 is not damaged because it only has the weight of the spring 60 thereon. It will be apparent that it would take considerable distortion or sloshing of the liquid to move the float member to cause actuation of the valve 52.

From the foregoing, it will be apparent that the automatic dump valve may be used in separators, tanks or the like handling all kinds of contaminating liquids such as sand, mud, slush, oil and still function properly. The large clearances and tolerances between the working parts of the automatic valve structure permits an efficient function, although the tank is utilizing liquid bodies of considerable different specific gravity. The use of the knife like circular rims on the valve seat precludes the possibility of sand and other debris depositing thereon and causing an improper function of the valve members. Furthermore, differential action of the valve assures a proper actuation thereof as long as there is any liquid in the tank of which it is necessary to establish a proper interfacial relationship therebetween.

Change may be made in the combination and arrangement of parts as heretofore set forth in the specification and shown in the drawings, it being understood that any modification in the precise embodiment of the invention may be made within the scope of the following claims without departing from the spirit of the invention.

I claim:

1. An automatic dump valve for discharging the heavier of two liquids from a container comprising a balanced float adapted to be disposed in a container, a main valve housing, a main valve provided in the housing, an inlet aperture in the housing communicating with one side of the valve, outlet ports provided in the housing and communicating with an opposite side of the valve, a diaphragm provided in the housing adjacent upper side of the valve, a pressure chamber above the diaphragm communicating with the diaphragm, a pilot valve provided in the housing above the pressure chamber, passageways providing communication between the pressure chamber and the pilot valve, passageways between the pilot valve and the outlet discharge ports, a floating guide member connected to the float member at its upper end and to the pilot valve at its lower end and disposed above the valve housing, and upper diaphragm means carried by the valve housing and connected to the guide member, the guide member being responsive to the movement of the float member for causing movement of the pilot valve whereby said pressure chamber is relieved to provide for an opening of the main valve.

2. A dump valve for a separator comprising a valve housing having high and low pressure chambers, main valve means disposed therebetween, a pilot valve disposed above the main valve, a diaphragm disposed in the high pressure chamber and engaging the main valve, a float member, a second diaphragm disposed above the pilot valve and connected to the float member, and floating guide means independently disposed above the pilot valve and connected to the second diaphragm, an aperture in the guide means, a valve rod for the pilot valve and extending through the aperture, and an adjustable nut on the valve rod and responsive to movement of the guide means in one direction to lift the pilot valve off its seat, means providing communication between the high pressure chamber and the unseated pilot valve to cause discharge of the liquid pressure from the high pressure chamber.

References Cited in the file of this patent

UNITED STATES PATENTS

| 1,521,355 | Burns | Dec. 30, 1924 |
| 2,169,561 | Layne et al. | Aug. 15, 1939 |
| 2,283,973 | Criss | May 26, 1942 |
| 2,599,498 | Suska | June 3, 1952 |
| 2,619,122 | Hunter | Nov. 25, 1952 |

FOREIGN PATENTS

| 299,215 | Germany | June 29, 1917 |